(12) United States Patent
Gevaud et al.

(10) Patent No.: US 6,282,946 B1
(45) Date of Patent: Sep. 4, 2001

(54) LEAK DETECTOR

(75) Inventors: Roland Gevaud, Pringy; Gilles Baret, Annecy, both of (FR)

(73) Assignee: Alcatel CIT, Paris (FR)

( * ) Notice: Subject to any disclaimer, the term of this patent is extended or adjusted under 35 U.S.C. 154(b) by 788 days.

(21) Appl. No.: 08/568,285

(22) Filed: Dec. 6, 1995

(30) Foreign Application Priority Data

Dec. 7, 1994 (FR) .................................................. 84 14708

(51) Int. Cl.$^7$ ...................................................... G01M 3/20
(52) U.S. Cl. ................................................................ 73/40.7
(58) Field of Search ................................................ 73/40.7

(56) References Cited

U.S. PATENT DOCUMENTS

| | | | |
|---|---|---|---|
| 3,690,151 | * | 9/1972 | Briggs .................................. 73/40.7 |
| 4,436,998 | * | 3/1984 | Tallon ................................. 73/40.7 X |
| 4,472,962 | * | 9/1984 | Mennenga ............................. 73/40.7 |
| 4,773,256 | * | 9/1988 | Saulgeot ............................... 73/40.7 |
| 5,116,196 | * | 5/1992 | Baret et al. ........................ 73/40.7 X |
| 5,297,422 | * | 3/1994 | Baret ..................................... 73/40.7 |
| 5,317,900 | * | 6/1994 | Bergquist ............................. 73/40.7 |
| 5,341,671 | * | 8/1994 | Baret et al. ........................... 73/40.7 |

FOREIGN PATENT DOCUMENTS

| | | |
|---|---|---|
| 0464292A1 | 1/1992 | (EP) . |
| WO9405990 | 3/1994 | (WO) . |

* cited by examiner

Primary Examiner—Hezron Williams
(74) Attorney, Agent, or Firm—Sughrue, Mion, Zinn, Macpeak & Seas, PLLC

(57) ABSTRACT

A leak detector including at least one analysis unit connected to the inlet of a first secondary pump, a pre-evacuation set connected to an inlet coupling, the inlet of said pre-evacuation set further being connected to the outlet of said first secondary pump via a pipe provided with a first valve, wherein said pre-evacuation set comprises a second secondary pump and a mechanical primary pump connected together in series, and wherein a pipe provided with a second valve connects an intermediate point of said first secondary pump to the inlet of said second secondary pump.

4 Claims, 2 Drawing Sheets

LEAK DETECTOR

BACKGROUND OF THE INVENTION

The present invention relates to a leak detector. The invention relates more particularly to a detector using a secondary pump having a high compression ratio and making it possible to measure very large leaks by operating in "counter-current" mode, as well as large leaks, with good sensitivity and excellent pumping speed, and therefore a short response time.

OBJECT AND SUMMARY OF THE INVENTION

The invention provides a leak detector including at least one analysis unit connected to the inlet of a first secondary pump, a pre-evacuation set connected to an inlet coupling, the inlet of said pre-evacuation set further being connected to the outlet of said first secondary pump via a pipe provided with a first valve, wherein said pre-evacuation set comprises a second secondary pump and a mechanical primary pump connected together in series, and wherein a pipe provided with a second valve connects an intermediate point of said first secondary pump to the inlet of said second secondary pump.

In order to obtain a good pumping speed as well as a high compression ratio, in as small a volume as possible, hybrid pumps are preferably chosen as the secondary pumps, each pump comprising two portions: a first portion, at the inlet end, of the turbomolecular blade type so as to procure a very good pumping speed, and a second portion, at the outlet end, of the Holweck type so as to obtain a good compression ratio.

Such a hybrid pump is known per se, and it offers the advantage of being more compact, for the same compression ratio, than a single-type turbomolecular blade pump. The Holweck stages are disposed coaxially inside the bell-shaped rotor of the blade stage. Moreover, the Holweck stages are cheaper than the blade stages.

By using a secondary pump in the pre-evacuation set, it is possible to use a dry pump, such as a diaphragm pump, as the primary pump. Whereas on its own, such a dry pump cannot produce a sufficient vacuum, by associating it with a secondary pump, the necessary vacuum can be achieved, and the assembly comprising the two pumps is much lighter (lighter by half) than a vane primary pump. Furthermore, this enables a leak detector to be provided that is entirely dry, i.e. oil-free.

BRIEF DESCRIPTION OF THE DRAWINGS

An embodiment of the invention is described below with reference to the accompanying drawings, in which.

MORE DETAILED DESCRIPTION

Figure 1:
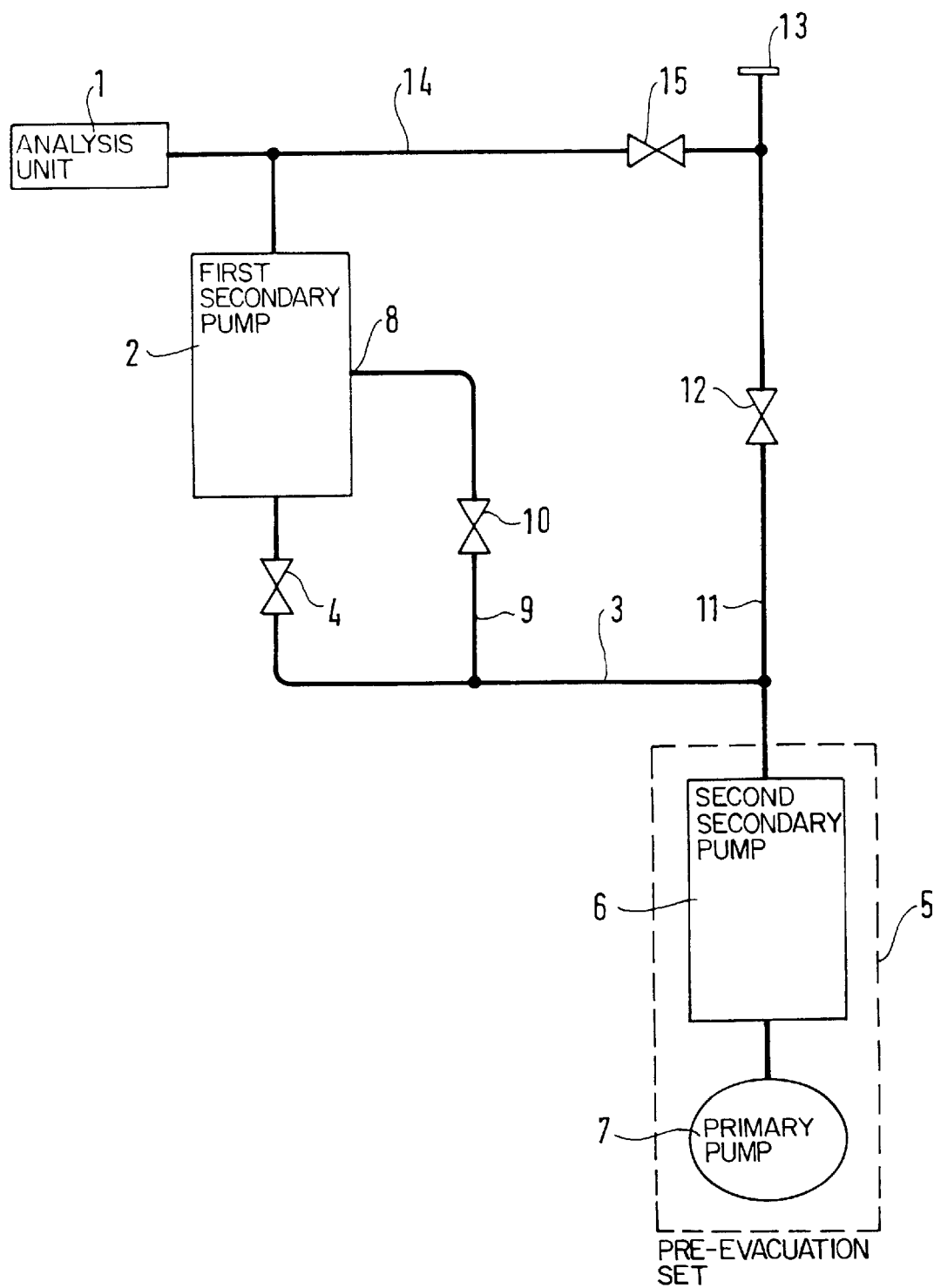
FIG. 1 is a diagram representing a leak detector of the invention.

FIG. 1 shows a helium leak detector including an analysis unit 1 such as a mass spectrometer that is set for helium. The unit 1 is connected to a first secondary pump 2. The outlet of the first secondary pump 2 is connected via a pipe 3 provided with a first valve 4 to a pre-evacuation set 5 composed of a second secondary pump 6 and of a dry primary pump 7, such as a diaphragm pump. The first secondary pump 2 includes an intermediate point 8 which is connected to the pipe 3, i.e. to the inlet of the second secondary pump 6, via a pipe 9 provided with a second valve 10. The pre-evacuation set 5 is connected via a pipe 11 provided with a third valve 12 to an inlet coupling 13 via which the leak detector can be connected to an enclosure to be tested. A pipe 14 provided with a fourth valve 15 connects the inlet coupling 13 to the inlet of the first secondary pump 2. The pipe 14 makes it possible to perform leak-testing in the conventional mode referred to as the "direct" mode which is very sensitive and which is used for very small leaks.

Figure 2:
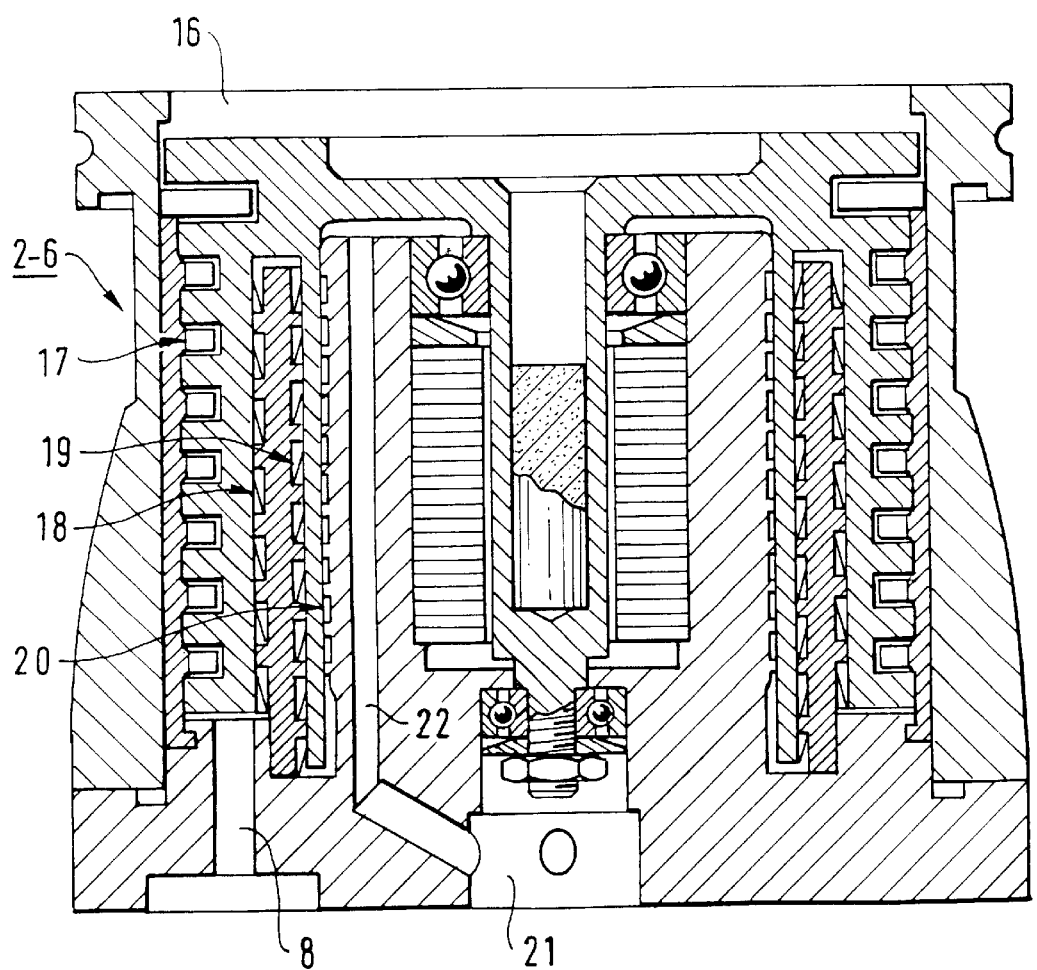
FIG. 2 shows a secondary pump of the hybrid type that is advantageously used for each of the two secondary pumps of the detector of the invention.

The pumps 2 and 6 (FIG. 2) are hybrid pumps, each of which comprises a turbomolecular blade stage 17 at the inlet end 16, so as to provide high pumping flow-rate: greater than 20 liters/second of air, followed, at the outlet end, by three coaxial Holweck stages 18, 19, and 20. Delivery takes place at 21 via a duct 22.

The intermediate point 8 is situated at the outlet of the turbomolecular blade stage 17, i.e. at the inlet of the first Holweck stage 18. On pump 6, the intermediate point 8 is merely closed off. It may be used to dispose a pressure sensor.

With such apparatus, the enclosure to be tested is pre-evacuated by the two pumps in series 6 and 7, with valve 12 open, and valves 15, 10, and 4 closed.

As soon as the pressure at the inlet 13 has decreased to 50 mbars, the measurement may be taken in "very large leak" mode by opening valve 4. In the event of a leak, the measurement is taken in "counter-current" mode via the first secondary pump 2 going towards the spectrometer 1. If the pressure continues to drop and decreases to less than 20 mbars at the inlet 13, the measurement may be taken in "large leak" mode by opening valve 10, thereby by-passing the high-pressure stages (of the Holweck type) of the first secondary pump 2, so that they are taken completely out of operation. In the event of a leak, helium flows back through the pump 2 in "partial counter-current" mode: from the intermediate point 8, thereby procuring good sensitivity. An excellent pumping speed is obtained by means of the turbomolecular blade stages of the second secondary pump 6, so that response is very rapid in the event of a leak. If the pressure continues to drop, and decreases to less than $4.10^{-3}$ mbars at the inlet 13, indicating that there is a small leak, or that there is no leak, testing is performed in "small leak" mode by closing valve 10 and valve 12, and opening valve 15.

Such a detector offers excellent performance levels with respect to sensitivity and response time over a very wide range of leaks going from the smallest leaks to very large leaks, i.e. of about 1,000 mbar.liter/second, while the detector is made both compact and lightweight by using hybrid pumps 2 and 6, and a diaphragm primary pump 7. Furthermore, the detector is of the dry type.

What is claimed is:

1. A leak detector including at least one analysis unit connected to the inlet of a first secondary pump, a pre-evacuation set connected to an inlet coupling, the inlet of said pre-evacuation set further being connected to the outlet of said first secondary pump via a pipe provided with a first valve, wherein said pre-evacuation set comprises a second secondary pump and a mechanical primary pump connected together in series, and wherein a pipe provided with a second valve connects an intermediate point of said first secondary pump to the inlet of said secondary pump, wherein said first secondary pump and said secondary pump are hybrid pumps, each of which comprises two portions: a first portion, at the inlet end, of the turbomolecular blade type, and a second portion, at the outlet end, of the Holweck type.

2. A leak detector according to claim 1, wherein said mechanical primary pump is a dry pump.

3. A leak detector according to claim 2, wherein the mechanical primary pump is a diaphragm pump.

4. A leak detector according to claim 1, wherein said intermediate point of said first secondary pump is situated between said two portions of the pump.

* * * * *